Feb. 23, 1960  A. J. ALTADONNA  2,926,021
CARRYALL VEHICLE FOR USE ON SOFT AND HARD SURFACES
Filed Dec. 11, 1957  2 Sheets-Sheet 1
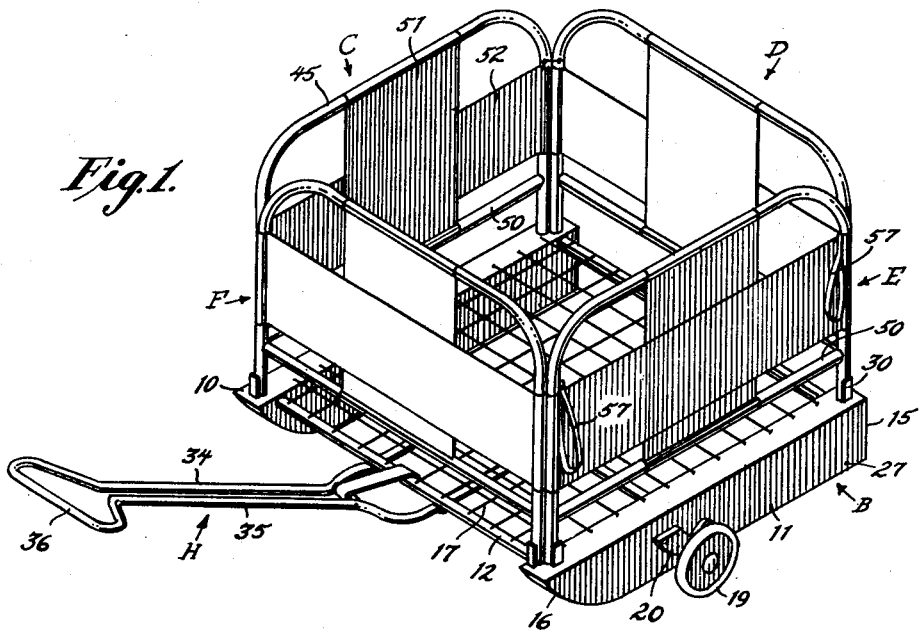
INVENTOR.
ANTHONY J. ALTADONNA
BY
Robertson and Gautier
ATTORNEYS.

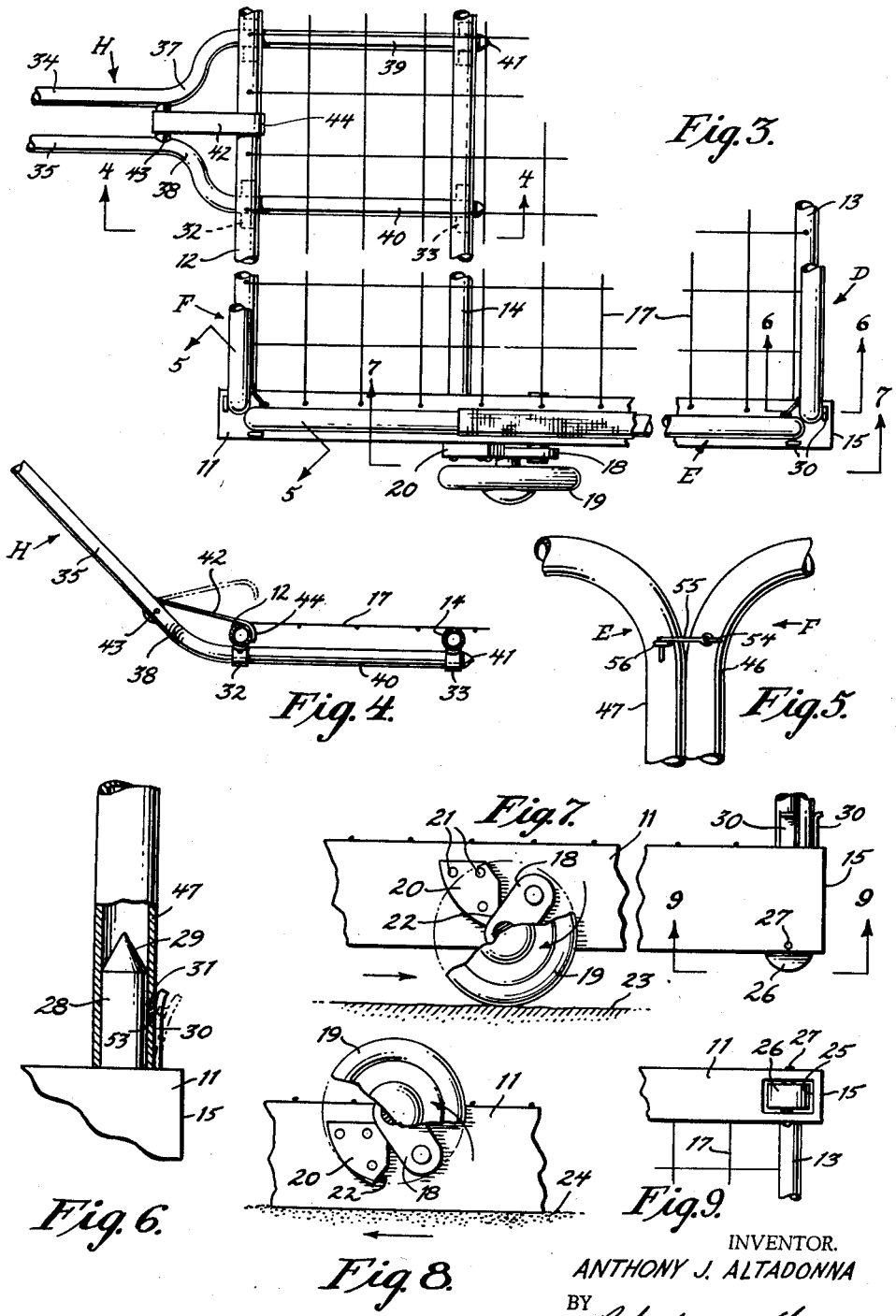

United States Patent Office 2,926,021
Patented Feb. 23, 1960

2,926,021

CARRYALL VEHICLE FOR USE ON SOFT AND HARD SURFACES

Anthony J. Altadonna, Camden, N.J.

Application December 11, 1957, Serial No. 702,038

3 Claims. (Cl. 280—11)

The present invention relates to a beach carryall and is concerned primarily with a device that is susceptible of being disassembled and stored in a compact condition and when assembled is particularly adapted to transport picnic supplies to and from a beach.

At the present time, it is common practice for a family, when going to the beach for a day, to drive the family car to a location conveniently accessible to the beach. Various picnic supplies and equipment must be transported from the car to the beach itself; and this presents a serious problem when it is considered that the supplies and equipment to be transported are often quite massive and extensive, and further because of the different nature of the surfaces over which any transport vehicles must travel. Ordinarily there will be paved surfaces, where the car is parked, which continue to a beach or the beach proper with curbs intervening. Thus a transport vehicle of the type with which this invention is concerned must be capable, in the first instance, of movement over the hard paved surfaces, during which curbs must often be mounted; and secondly, susceptible of being dragged over the sand much in the manner of a sled because of the difficulty of having wheels operate in the sand. It is also desirable that, once the transport vehicle has reached the beach, it be susceptible of disassembly into elements having individual utility on the beach.

The invention has, as its object, the provision of a beach carryall consisting essentially of a bottom made up of a pair of side runners, front and rear crossbars, an intermediate crossbar, and a wire mesh, together with main supporting wheels mounted on the runners for swinging movement into and out of operative position and auxiliary supporting rollers on the front ends of the runners. Four side members are detachably erected from the bottom by having tubular members which receive stub posts on the bottom and latches at each corner adjacent to the top. A handle including a bifurcated end is detachably secured to the bottom, with the bifurcated end portions being received in brackets, and a hook member being connected to the crossbar of the bottom.

For a full and more complete understanding of the invention, reference may be had to the following description and accompanying drawings, wherein:

Figure 1 is a perspective view of a beach carryall designed in accordance with the precepts of this invention and shown in assembled position;

Figure 2 is a perspective view depicting the bottom, a portion of the handle, and one of the side members in exploded relation;

Figure 3 is a top plan view taken as a fragmentary illustration of the botom of the carryall with parts broken away;

Figure 4 is a detailed longitudinal vertical section taken about on the plane represented by the line 4—4 of Figure 3 and illustrating the manner in which the handle is detachably secured to the bottom;

Figure 5 is a detail looking from the inside of one of the corners, being taken about on the plane represented by the line 5—5 of Figure 3, and depicts one of the latches which holds the two side members which meet at a corner assembled;

Figure 6 is a detailed vertical section, taken about on the plane represented by the line 6—6 of Figure 3, illustrating the manner in which one of the stub posts receives one of the legs of a side member;

Figure 7 is a detailed view in side elevation, and with parts broken away of one side of the bottom, illustrating one of the supporting wheels in operative position;

Figure 8 is a view similar to Figure 7 depicting the supporting wheel in inoperative position; and Figure 9 is a detail taken as a bottom plan at a front corner, more particularly on the plane represented by the line 9—9 of Figure 7, depicting one of the auxiliary rollers.

Referring now to the drawings, wherein like reference characters denote corresponding parts, and first more particularly to Figures 1 and 2, the beach carryall of this invention is therein illustrated as comprising six main elements or parts. These are a bottom which is referred to in its entirety by the reference character B, a handle which is designated generally H, and four side members identified in their entireties by the reference characters C, D, E, and F.

The bottom B comprises a pair of side runners 10 and 11, together with a rear crossbar 12, a front crossbar 13, and an intermediate crossbar 14. It will be understood that the runners 10 and 11, as well as the crossbars 12, 13, and 14, may be made from any appropriate material such as metal or wood; and if metal is employed the invention has particularly in mind the use of such metals as magnesium, aluminum, or steel. The crossbars 12, 13, and 14 are preferably of tubular construction; while the side runners 10 and 11 are preferably solid, although they may be of a channel construction. In either case, the front ends of these members are squared as indicated at 15; while the rear ends are rounded as depicted at 16. The purpose of this will later become apparent. Extending over the upper edges of the runners 10 and 11 and secured thereto, as well as to the crossbars 12, 13, and 14, is a wire mesh identified at 17.

The intermediate crossbar 14 is preferably continued out beyond the outer side face of the runners 10 and 11 to provide projecting portions on which are pivotally mounted arms 18. One of these arms 18 is shown in Figures 7 and 8 in conjunction with the runner 11; and it will be understood that there is another arm similarly mounted on the runner 10. A main supporting wheel 19 is pivotally mounted on the end of the arm 18 remote from the latter's pivotal connection to the crossbar 14. An abutment member 20 is secured to the outer face of each of the runners 10 and 11 in any preferred manner, such as by the fastening elements shown at 21, and has an abutment edge at 22 that is adapted to be engaged by an edge of the arm 18 after the latter has passed a vertical position in the manner depicted in Figure 7. In this position, the wheels 19 support the runners 10 and 11 over a paved surface such as represented at 23; and the bottom is adapted to be pushed frontwardly—that is, in the direction of the arrow of Figure 7.

It is evident that the wheels 19 are adapted to be swung upwardly into the ineffective position depicted in Figure 8, in which event the side runners 10 and 11 rest on the sandy beach surface indicated at 24. In this position, the runners are adapted to be pulled to the rear in the direction indicated by the arrow of Figure 8.

Opening into the bottom surface of each of the runners 10 and 11 at their forward ends is a recess or opening 25 in which is operatively mounted an auxiliary roller 26 that is rotatably mounted on a stub shaft 27. These rollers 26 are adapted to engage a curb as the latter is mounted so as to support a major part of the load as the carryall passes over such a curb.

At the front and rear ends of each of the runners 10 and 11 there are a pair of stub posts 28. One of these posts is shown in detail in Figure 6 and has a pointed end 29 which functions as a guide, as will be later described. Associated with each stub post 28 is a spring detent in the form of a spring arm 30 carrying a pin 31, with the spring arm 30 being spaced from the post 28 with which it is associated.

Referring now more particularly to Figures 2, 3, and 4, it will be noted that a pair of brackets 32 are secured to the underside of the rear crossbar 12. Another pair of brackets 33 are secured to the underside of the intermediate crossbar 14. These brackets 32 and 33 are in substantial alignment.

The handle H is shown as comprising a pair of rods 34 and 35 which are fairly close together throughout the major part of their lengths and which have integrally joined to their outer upper ends a crosshead 36 which constitutes a hand grip. At their lower ends the rods 34 and 35 are bent outwardly as indicated at 37 and 38 to provide a bifurcated end construction comprising the parts 39 and 40. The latter have pointed ends as indicated at 41. These bifurcated end portions 39 and 40 are received in the aligned brackets 32 and 33 in the manner depicted in Figures 3 and 4; and the pointed ends 41 facilitate this insertion. A hook or latch 42 is pivotally mounted at its upper end on a crosspin 43 that extends between the bars 34 and 35 where the latter merge in with the bends 37 and 38; and the other end of this latch 42 carries a bill 44 that is fitted over the rear crossbar 12 in the manner shown in Figures 3 and 4. Thus the handle H is securely attached to the bottom B and is adapted to be either pushed to impart a forward movement to the carryall or pulled to impart a rearward movement thereto.

With perhaps one minor exception, the side members C, D, E, and F are all substantially alike; and only one of them is herein described in detail as that is believed to be sufficient for the purposes of this specification. Referring to Figure 2, it will be noted that the side member C comprises a tubular member that is bent into a U-shaped formation presenting a back or top 45 and legs 46 and 47. The leg 46 is joined to the back 45 by a bend 48; while the leg 47 is joined to the back 45 by a bend at 49. A cross strut 50 extends between the legs 46 and 47 and has its ends joined to the respective legs at points spaced from the lower free ends of these legs. A strip of fabric 51 has its opposite ends secured to the back 45 and cross strut 50 in a well-known manner, such as by having the ends of the strip formed with loops which receive the back and cross strut, respectively. Another strip of fabric 52 extends between the legs 46 and 47 and has its ends secured thereto in the same manner. These strips 51 and 52 are in crossed relation and provide the main surface of the respective side member.

Referring now more particularly to Figure 6, and recalling that the legs 46 and 47 are tubular, it will be noted that the lower end of the leg 47 is shown as receiving one of the stub posts 28. The pointed end 29 facilitates insertion of the post 28 in the hollow leg 47. As this hollow leg is forced downwardly, the spring arm 30 is sprung outwardly into the dotted-line position of Figure 6 until the pin 31 comes opposite to an opening 53 formed in the tubular leg 47. The spring action of the arm 30 now moves the pin into this opening to securely lock the leg in position in the post.

Referring now more particularly to Figures 3 and 5, it will be noted that the leg 46 of the side member E has pivotally mounted thereon in a well-known manner as indicated at 54 a latch member 55. The post 47 of the side member F is provided with an eye 56 which receives the hook of the latch 55. With the hook of the latch received in this eye, the upper ends of the posts 46 and 47 of the members E and F are securely held together. Moreover, this arrangement is repeated at each of the four corners.

As shown in Figure 1, the side member E may be provided with a pair of loops 57 which are adapted to receive a beach umbrella when collapsed in a well-known manner.

Operation

While the mode of operation and manner of using the beach carryall of this invention is believed to be obvious from the illustration of the drawings and description of parts given, they may be briefly outlined as follows:

It will first be assumed that the carryall is completely disassembled, in which condition it is adapted to be stored in a compact condition in a motor vehicle or other place. When the scene is reached where it is to be used, the side members C, D, E, and F are first erected on the bottom B by having the lower ends of the legs 46 and 47 fitted over the several stud posts 28 in the manner shown in Figure 6. The spring detents 30 hold this established position. The several latches 55 are then manipulated so that the hooks engage the eyes 56. Thus, the several side members are joined at each corner adjacent to their upper ends. The bifurcated end portions 39 and 40 of the handle H are now inserted in the brackets 32 and 33 and the bill 44 of the hook 42 placed in engagement with the rear bar 12.

Any picnic supplies or equipment may now be deposited on the bottom B within the four side members and will be contained therein in an obvious manner. Moreover, a beach umbrella may be slid through the loops 57.

The operator now grasps the grip 36 of the handle H and pushes the carryall over any hard or paved surface. Before this action takes place, the main supporting wheels 19 will have been swung down into the operative position depicted in Figure 7. It is evident that a forward thrust on the handle causes the upper rear edges of the arms 18 to abut against the edges 22 of the abutment members 20. When a curb is reached, the handle is manipulated so that the auxiliary rollers 26 will engage the top surface of the curb, whereupon the handle may be raised to move the main wheels 19 over the curb.

When the beach itself is reached and it is necessary to move the carryall over the soft sandy surface, the main supporting wheels 19 are swung into their inoperative position depicted in Figure 8. The carryall is now moved by pulling on the handle H; and the curved edges at 16 facilitate this action.

When the desired beach site is reached, the beach umbrella is removed from the loops 57 and the contens of the carryall unloaded. The several sides C, D, E, and F are then disassembled from the bottom B. The bottom B is now susceptible for use as a beach table, in which event the beach umbrella may be erected, such as by passing it through an opening in the wire mesh 17. The several members C, D, E, and F are also available for individual use, such as backrests. When so used, the U-shaped supports 58 are swung outwardly to engage the sand and supplement the supporting effect of the legs 46 and 47 being embedded in the sand. Each of these supports 58 has legs 59 which are pivotally connected to the legs 46 and 47, as indicated at 60, and a bottom or back 61 that is integrally joined to the legs 59 and which normally assumes a position close to the strut 50. They are particularly adapted for such use because those portions of the legs 46 and 47 below the cross strut 50 may be pushed into the sand to provide the necessary support.

When the day is over, the carryall is assembled in the manner above described and the return trip to the automobile made in an obvious manner.

While a preferred specific embodiment of the invention is hereinbefore set forth, it is to be clearly understood that the invention is not to be limited to the exact constructions, mechanisms, and devices illustrated and described, because various modifications of these details may be provided in putting the invention into practice within the purview of the appended claims.

What is claimed is:

1. In a carryall vehicle for use on soft and hard surfaces, a pair of side runners having upwardly curved rear ends, lateral crossbars extending between said runners, a pair of axially rotatable wheels respectively adjacent to said runners, means mounting each of said wheels on said runners for free swinging movement past vertical dead-center position between a rearward position extending below said runners for rolling supporting engagement with a ground surface and a forward position above the bottom surface of said runners, and means limiting the rearward movement of said wheels to said rearward position, said wheels thus being maintained in their limiting rearward position upon forward movement of said runners and being swingable forward and elevated upon rearward movement of said runners on soft ground.

2. A vehicle according to claim 1, said mounting means each comprising a link having one end pivotally connected to the respective wheel and having its other end connected to the respective runner for swinging movement about a lateral axis between a rearward position rearward of the vertical dead center with the wheel extending below the adjacent runner for rolling supporting engagement with a ground surface and a forward position forward of the vertical dead center with the wheel above the bottom surface of the adjacent runner, and said limiting means comprising abutment means carried by each of said runners in position for abutting engagement with said links to limit rearward swinging movement thereof to a position just sufficiently beyond dead center to remain therebeyond under all normal forward runner movement and to be swingable forward beyond dead center and elevated above the bottom surface of the adjacent runner upon rearward runner movement along soft ground.

3. A vehicle according to claim 2, in combination with auxiliary rollers carried at the forward ends of said runners and depending therebelow a distance less than that of said wheels in their rearward position, for convenient rolling engagement with a stepped ground surface.

References Cited in the file of this patent

UNITED STATES PATENTS

| | | |
|---|---|---|
| 613,102 | Wilson | Oct. 25, 1898 |
| 883,258 | Tolle | Mar. 31, 1908 |
| 1,023,617 | Botteese | Apr. 16, 1912 |
| 1,571,880 | Young | Feb. 2, 1926 |
| 1,790,195 | Baker | Jan 27, 1931 |
| 1,969,048 | Smith | Aug. 7, 1934 |
| 2,296,415 | Baker et al. | Sept. 22, 1942 |
| 2,575,846 | Singer | Nov. 20, 1951 |

FOREIGN PATENTS

| | | |
|---|---|---|
| 614,782 | Great Britain | Dec. 22, 1948 |
| 267,834 | Switzerland | July 17, 1950 |